(12) United States Patent
Trantham

(10) Patent No.: US 6,918,204 B1
(45) Date of Patent: Jul. 19, 2005

(54) BLADES, FISHING LURES AND FINISH PROCESSES THEREFOR

(76) Inventor: David J. Trantham, 207 S. Kyle, Republic, MO (US) 65738

(*) Notice: Subject to any disclaimer, the term of this patent is extended or adjusted under 35 U.S.C. 154(b) by 58 days.

(21) Appl. No.: 10/321,950

(22) Filed: Dec. 17, 2002

Related U.S. Application Data

(60) Provisional application No. 60/341,738, filed on Dec. 18, 2001.

(51) Int. Cl.⁷ .............................................. A01K 85/00
(52) U.S. Cl. .................... 43/42.13; 43/42.11; 43/42.31
(58) Field of Search ............................ 43/42.11, 42.13, 43/42.31

(56) References Cited

U.S. PATENT DOCUMENTS

| | | | | |
|---|---|---|---|---|
| 271,424 A | * | 1/1883 | Comstock ................... | 43/42.13 |
| 1,682,710 A | * | 8/1928 | Pflueger ..................... | 43/42.13 |
| 1,731,161 A | * | 10/1929 | Farley ........................ | 43/42.13 |
| 1,734,883 A | * | 11/1929 | Shannon ..................... | 43/42.13 |
| 3,104,486 A | * | 9/1963 | Gressard ..................... | 43/42.17 |
| 3,112,576 A | * | 12/1963 | Tay ............................ | 43/42.14 |
| 3,397,478 A | * | 8/1968 | Lowes ........................ | 43/42.14 |
| 4,510,710 A | | 4/1985 | Hanna et al. ............... | 43/42.13 |
| 4,641,455 A | * | 2/1987 | Johnson ..................... | 43/42.13 |
| 4,718,191 A | | 1/1988 | Gentry ....................... | 43/42.13 |
| 4,793,089 A | | 12/1988 | Long et al. ................. | 43/42.13 |
| 5,050,334 A | * | 9/1991 | Standish, Jr. ............... | 43/42.13 |
| 5,201,784 A | * | 4/1993 | McWilliams ................ | 43/42.31 |
| 5,303,497 A | | 4/1994 | Rabideau .................... | 43/42.21 |
| 5,355,612 A | * | 10/1994 | Smith ......................... | 43/42.13 |
| 5,499,470 A | * | 3/1996 | Reed .......................... | 43/42.13 |
| 5,987,805 A | | 11/1999 | Laney ........................ | 43/42.13 |

OTHER PUBLICATIONS

Drawing Sheet from U.S. Trademark Application No. 76/335,660, filed Nov. 8, 2001.
Specimen of use in commerce from U.S. Trademark Application No. 76/335,660 (copyrighted 2001).

* cited by examiner

Primary Examiner—Kurt Rowan
(74) Attorney, Agent, or Firm—Jonathan A. Bay

(57) ABSTRACT

A buzzbait has an underlying free arm wire which is formed with a leading, line-pulled central portion flanked by first and second trailing arms. The first arm rotatably carries a reaction impeller. The second arm carries a slug in a leading position ahead of a trailing hook. The reaction impeller is produced with multiple arms to facilitate slow retrieves in which the buzzbait nevertheless rides on the surface rather than sink. The blade tips of the reaction impeller, in combination with the arrangement of the arms and location of the slug, are positioned to strike the slug with each pass. This produces a fish-attracting effect, namely a sound something like a "cow bell." The slow retrieves facilitate low-repetition rates with the "cow bell" sound.

17 Claims, 6 Drawing Sheets

(4 of 6 Drawing Sheet(s) Filed in Color)

VISION LURES POWDER PAINT PROCESS
*FIG. 4.*  <u>TWO COLOR FINISH</u>
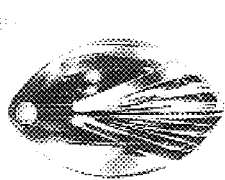    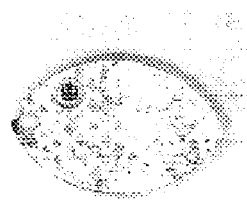
STEP 1  STEP 2  STEP 3
*FIG. 5.*  <u>THREE COLOR FINISH</u>
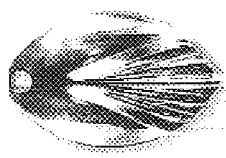      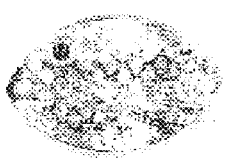
STEP 1  STEP 2  STEP 3  STEP 4

FIG. 6.  FOUR COLOR FINISH
STEP 1    STEP 2    STEP 3
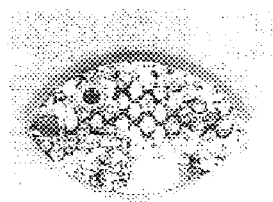
STEP 4    STEP 5    STEP 6    STEP 7

FIG. 7. APPLICATION WITH BUZZBAIT BLADE
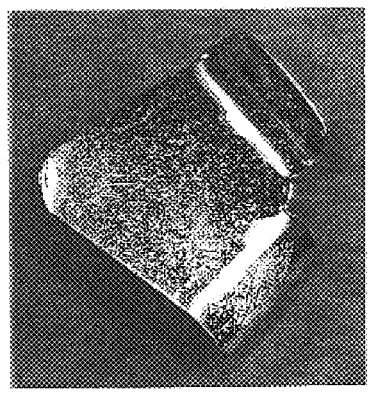
STEP 1
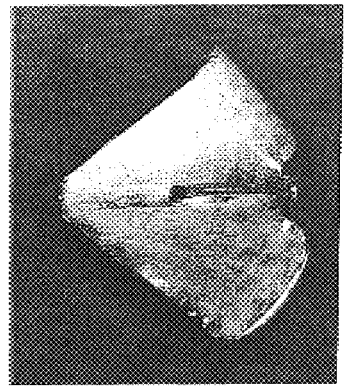
STEP 2
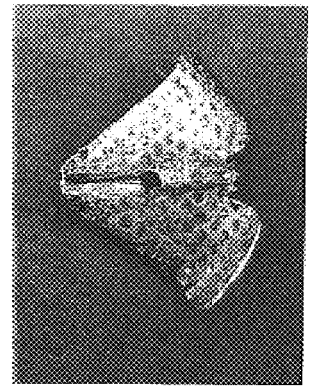
STEP 3

FIG. 8. APPLICATION WITH JIG HEAD
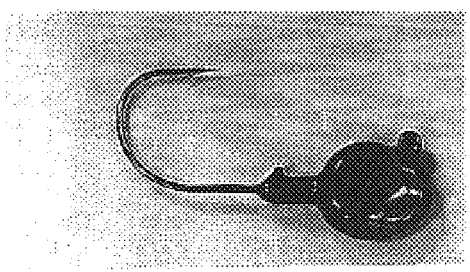
STEP 1
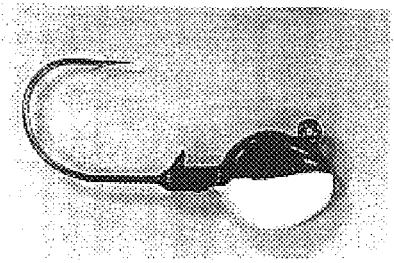
STEP 2
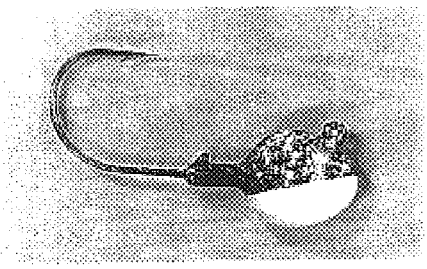
STEP 3
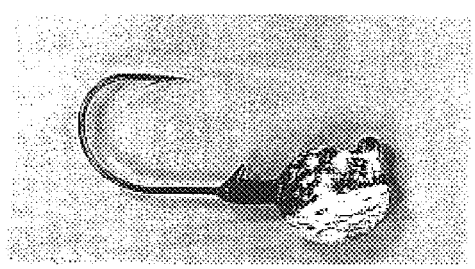
STEP 4
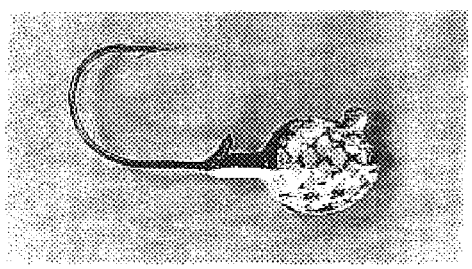
STEP 5
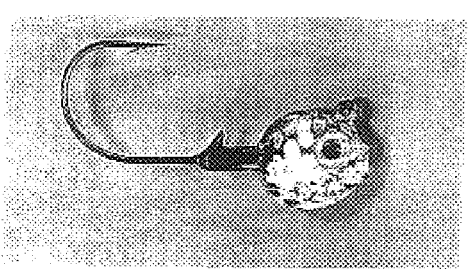
STEP 6

BLADES, FISHING LURES AND FINISH PROCESSES THEREFOR

CROSS-REFERENCE TO PROVISIONAL APPLICATION(S)

This application claims the benefit of U.S. Provisional Application No. 60/341,738, filed Dec. 18, 2001.

BACKGROUND AND SUMMARY OF THE INVENTION

The invention relates to fishing lures and, more particularly, to blades for a buzzbait which blades are also known as reaction impellers, and additionally to a powder paint process for application of a finish to fishing lures including the bodies and/or blades of buzzbaits, spinner baits and the like.

A number of additional features and objects will be apparent in connection with the following discussion of preferred embodiments and examples.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

There are shown in the drawings certain exemplary embodiments of the invention as presently preferred. It should be understood that the invention is not limited to the embodiments disclosed as examples, and is capable of variation within the scope of the appended claims. In the drawings.

FIG. 4 depicts in three views a powder paint process for fishing lures in accordance with the invention for achieving a two color finish wherein the substrate is plated steel, or more particularly, a plated steel spinner blade;

FIG. 5 depicts in four views the powder paint process for fishing lures in accordance with the invention for achieving a three color finish wherein the substrate is plated steel, or more particularly, a plated steel spinner blade;

FIG. 6 depicts in seven views the powder paint process for fishing lures in accordance with the invention for achieving a multi-aspect four color finish wherein the substrate is plated steel, or more particularly, a plated steel spinner blade;

FIG. 7 depicts in three views the powder paint process for fishing lures in accordance with the invention for achieving a three color finish wherein the substrate is aluminum, or more particularly, an aluminum buzzbait blade; and, FIG. 8 depicts in six views the powder paint process for fishing lures in accordance with the invention for achieving a multi-aspect four color finish wherein the substrate is lead, or more particularly, a leaden jig head.

DETAILED DESCRIPTION OF THE PREFERRED EMBODIMENTS

Figure 1:
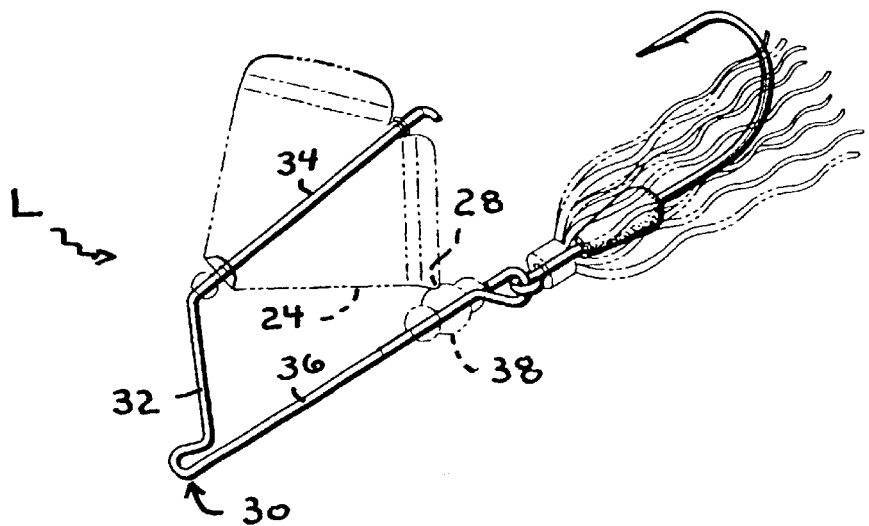
FIG. 1 is a perspective view of a buzzbait adaptable for utilizing a reaction impeller in accordance with the invention.
Figure 2:
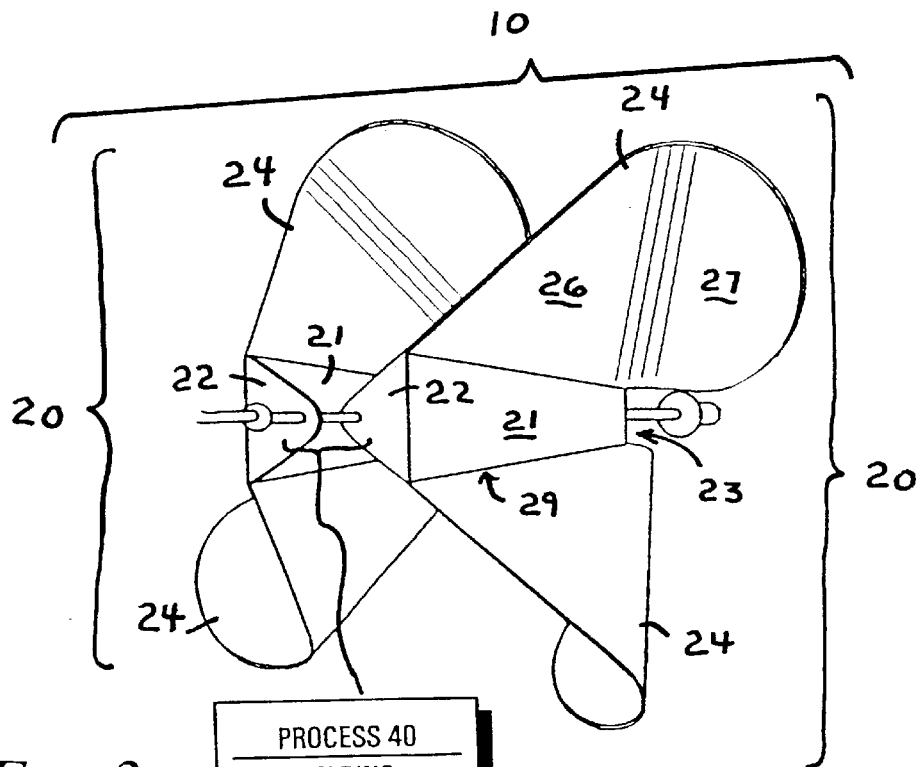
FIG. 2 is a perspective view of a reaction impeller in accordance with the invention prior to the separate double-bladed leaves thereof being fixed permanently together.

FIG. 1 is a perspective view of a buzzbait L representative of the buzzbait class of artificial lures in general and certainly one which will readily accommodate a reaction impeller 10 in accordance with the invention. FIG. 2 shows a reaction impeller 10 in accordance with the invention prior to the separate double-bladed leaves 20 thereof being fixed permanently together. With general reference to FIGS. 1 and 2, the lure L comprises an underlying wire 30 having a central, line-pulled leading portion 32 flanked by first and second trailing arms 34 and 36 terminating in respective outer ends. A reaction impeller 10 (or more accurately in FIG. 2, an assembly) is mounted for rotation about the wire on the first arm 34. The second arm 36 carries a slug or deflector 38 in a leading position ahead of a trailing fish hook. The second arm 36 and/or fishhook can be optionally dressed or weighted as illustrated for example.

One embodiment of the invention has the reaction impeller 10 comprising an assembly of dual (ie., two) double-bladed leaves 20 or units. Each unit 20 has a central body portion 21 extending axially between leading and trailing apertured lugs 22 and 23 (trailing apertured lugs hidden from view) and radially between angularly-spaced first and second blade portions 24. The blade portions 24 have leading delta-portions 26 changing into trailing flap portions 27. These two such double-bladed units 20 are fixed together by fixing at least the respective leading apertured-lug portions 22 to each other, or alternatively at least the respective trailing apertured lug-portions 23 to each other (hidden from view), or more preferably still, doing it both ways in one assembly 20. The end-product reaction impeller assembly 20 will provide for all the apertures thereof to be able to align on a common axis for threading the first arm 34 therethrough. The arrangement of four blades 24 fixed to a central body 21 and 21 and generally with the blades 24 at right angles to each other allows for slower retrieves that ride the buzzbait L on surface without sinking than obtainable with two blades. Additionally, the retrieve of the lure L utilizing the inventive reaction impeller 10 comes back straighter and smoother than the floppy, unnaturally erratic return of a lure in accordance with U.S. Pat. No. 4,793,089—Long et al.

Given the foregoing, the end-product reaction impeller assembly 10 has four fixed-in-position rather equi-angularly spaced blades 24 which, with reference to FIG. 1, every one of the blades 24 presents a blade tip 28 at the outboard extreme thereof which, in combination with the arrangement of the arms 34 and 36 and under pull of retrieval by the fishing line, is oriented to strike against the slug or deflector 38 on the second arm 36. That is, the blade tips 28 strike the slug 38 with every pass, there thus being four strikes (or however many blades 24 there are) each revolution of the impeller 10, each strike occurring over relatively constant intervals for a steady retrieve. The rate or staccato of the strikes can be changed by correspondingly changing the rate of the retrieve. This is done so for fish-attracting effects. In cases in which the blades 24 are produced from sheet metal, particularly aluminum, a primary fish-attracting effect of the blades 24 striking the slug 38 is production of sound approximately like that of a cow-bell. Preferably the slug 38 is likewise metallic and more preferably something like stainless or brass. Making the slug 38 metallic further enhances the sound effect albeit in small part. The slug 38 may not actually be a single device such as an apertured cylinder or bead, but may be a series of devices such as a combination of cylindrical-forms or beads. It is preferred if the slug 38 is formed in way which will promote deflection of the blade tips 28 as they strike. The object is to produce a sound and not stop the impeller 10. The drawings show cylindrical forms including without limitation cylinders and/or beads.

In view of the above, it is advantageous that the impeller 10 have multiple blades 24. That way, the lure L can be retrieved very slow and yet still ride on the surface without sinking, and at the same time yield a low-rate of repetition "cow bell" sound. A rusted-steel pop rivet body may be used, secured to the first arm 34 and directly contacting the reaction impeller 10 in a fashion which allows rotation while in rubbing contact. This aspect too further enhances the sound effects of the lure L.

With reference to FIG. 2, each double-bladed leaf 20 is produced as a single-piece end-product from sheet metal, preferably sheet aluminum. Each unit 20 is arranged such that the central body portion 21 is generally planar and the delta-portions 26, also generally planar, diverge from the central body portion 21 at respective creases 29 to be generally perpendicular to each other. The lugs (eg., only lugs 22 in view) comprise formed-over tabs of the axially-spaced ends of the central body portion 21.

For convenience of illustration, FIG. 2 shows the separate leading apertured-lugs 22 and 22 of the one and another single-piece leaves 20 spaced by a gap. Convenience of illustration aside however, it is highly preferably that such gap between the separate leading apertured-lugs 22 and 22 be closed and the separate leading apertured-lugs 22 and 22 be fixed permanently together. Suitable optional ways to fix the lugs 22 and 22 together include by welding, brazing, braze welding, epoxy bonding or other bonding techniques 40. Indeed, one suitable product is commercially known as "JB weld," which despite the name is in fact an epoxy product.

Figure 3:
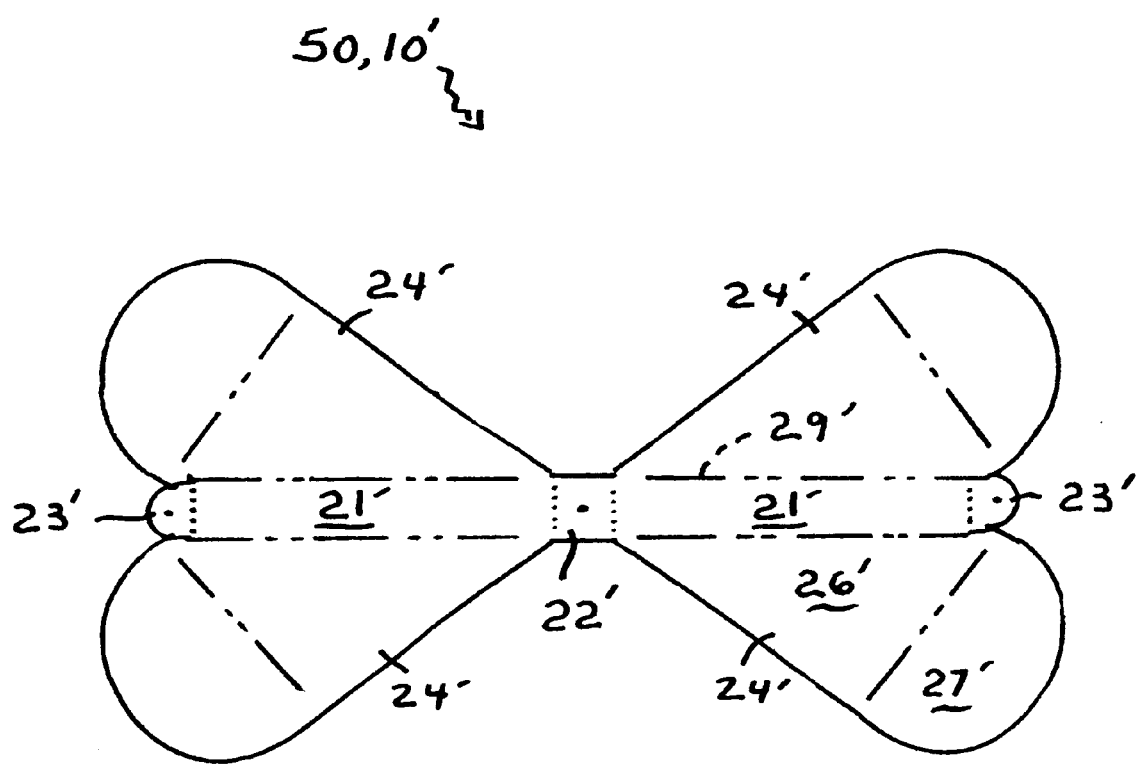
FIG. 3 is a plan view of a flat pattern for producing one version of the reaction impeller in accordance with the invention as a single-piece end-product of folded up sheet metal.

FIG. 3 is a plan view of a flat pattern 50 for producing an alternate embodiment of a reaction impeller 10' in accordance with the invention. In this alternate embodiment, the reaction impeller 10' ultimately will be a single-piece end-product of folded up sheet metal (folded-up end-product form not shown). In FIG. 3, the flat pattern 50 in has a leading apertured-lug 22' which operates more or less as a center of geometry of the pattern 50. The end-product's central body (see, eg., 21 and 21 in FIG. 2) has generally planar components 21 as shown in FIG. 2, but which in the flat pattern 50 radiate from the leading apertured-lug 22' on spoke lines and terminate in tabs 23' for forming over to produce trailing apertured-lugs. The blades 24' in the flat pattern 50 are arranged relative the leading apertured-lug 22' as petals, or something like that. The delta-portions 26' will also remain generally planar and diverge from respective ones of the central body's planar components 21' at respective creases 29' to be relatively equi-angularly spaced from one another. When folded up properly, all apertures of said apertured lugs 22' and 23' in the end-product reaction impeller 10' are able to align on a common axis for threading the first arm (see, eg., 34 in FIG. 1) therethrough.

Whereas FIG. 3 shows a four-bladed flat pattern 50, persons having ordinary skill in the art could readily devise a three-bladed pattern around a central hub.

FIG. 4 depicts in three views a powder paint process for fishing lures in accordance with the invention for achieving a two color finish wherein the substrate is plated steel, or more particularly, a plated steel spinner blade. The referenced two colors comprise the substrate's original color which is silvery in FIG. 4, and the paint color which is white in this example.

The view of step 1 shows a nickel-plated steel blade giving it a silvery color, although the blade could be plated with other materials including for example to obtain a gold finis. This is an instance of plated steel in contrast to a substrate produced of other materials say lead, tin or aluminum.

The results obtained by the view of step 2 are gotten by a process of heating the blade and sprinkling on paint powder. A source of heat is adequately provided by a propane torch sitting on a bench. A worker holds the blade by needle nose pliers or the like and waves the blade in the hot exhaust of the lit torch. The pliers are manipulated to grip the blade by the apertured end to block as little as possible of the substrate surface. Preferably the worker heats the back side of the blade (ie., opposite from side that is/will be undergoing the painting treatment). The worker waves the blade around in the hot exhaust to avoid hot spots which result in undesirable blistering or bubbling of the plate material. If plate material blisters or bubbles, then the blade is rejected right away, and discarded.

The activity of sprinkling powder paint comprises literally the worker with his or her free hand pinching a supply of powder paint and sprinkling or dashing it on the hot blade surface. That is, while continuing to hold the blade in the needle nose pliers, the worker orients the blade face up. Upon the upward face, the worker applies a sprinkle or dashed coat of powder paint. In the example of FIG. 4, the powder paint is white. A suitable powder paint is sold under the brand Pro-Tech™ by Component Systems, Inc. This is the same kind of paint used in industry to coat dishwashers and appliances and the like.

The sprinkling or dashing technique is probably is where all the art is. The choices over how much to sprinkle or dash and then how to sprinkle or dash to get the desired end pattern require some trial and error to get the desired results. FIG. 4 shows an example of a single paint color (white) applied without varying the density scale in different regions. The meaning of density scale includes the following aspects. The paint powder is sprinkled or dashed upon the substrate to achieve the following effect all over the applicable surface area. Upon the applicable surface area, there will be what can be classified as three regions. One region comprises blobs having irregular boundaries and thickness of solid paint color. Another region comprises bare areas of substrate which remain uncovered to any significant extent and hence still shine through without being covered over. An intergrade regions comprises minuscule dots of paint powder that lightly freckle the substrate. The intergrade region is various and ranges in scale from something approaching 0% coverage to something other approaching 100% coverage.

The object at this phase is to not cover the blade solidly in the paint color. One goal that has proven desirable is to cover about 60–85% of blade with the paint color. Of that, the portion which is covered with the thickest clumps is something less still, say 20–30% of total surface area. That leaves the intergrade regions comprising about 30–65% of total surface area, with the remainder left bare. Again, the intergrade region is characterized by varying amounts of the faintest lightest amount of finely divided paint powder.

The time interval between application of heat and application of powdered paint is small, on order of 10 seconds. There is some flexibility. If the blade gets too cool, then the blade is merely warmed over heat source again, even if it has some powderized paint already applied to it. The heat source will eventually supply sufficient temperature to flow or liquify the paint after which, when allowed to sufficiently cool, will permanently harden and bond to the substrate. This kind of paint provides a waterproof, durable, and glossy finish. The hardened paint is very tough and drys fast, as in a matter of moments and certainly not day(s). The heat momentarily stored in the cooling blade causes the powder to puddle up in a moderately liquified form. The puddled paint hardens permanently in 30 seconds or so. The surface now has a bumpy, irregular texture. The metal of the substrate shines through in spots, and is covered over in varying measures of dot-density and thickness of paint in other spots.

Originally this project experienced a trial and error phase during which the technique was refined. At present, only one blade out of hundreds is rejected. But early on there were instances of too much paint, and during this learning phase, experience taught the following. If too much powder is applied during heating phase, blobs of too much mass and build-up will appear where the powder landed. Over time such a mass like that will crack and present too severely of a rutted contour so that the holographic tape (described more particularly below) doesn't apply correctly. There is really no instance of applying too little of the powder paint because in those instances, the worker simply keeps re-heating and sprinkling on more until the worker is satisfied with the results.

The view of step 3 shows the final result after the application of a layer of holographic film tape. This film tape has one side provided with an adhesive, and is something like a sticker or decal with a holographic pattern of fan-tail shaped holographic scales spaced apart on a clear film. The worker cleans up by trimming the excess holographic film tape around the outline of the blade. The worker also presses upon the tape all around with thumb pressure to work out all bubbles that may have occurred. The last work done on the blade may be the attachment of an optional eye button.

The back side is optionally left bare and untreated. In use, as the spinner bait (not shown) is retrieved, the spinner blade spins naturally enough. The view given to an observer is alternate cycles of a view of the convex treated surface in contrast to a succeeding view of the concave untreated surface. In other words, the spinner blade gives the appearance of alternate flashes of silver and color in succession, the tempo of the alternate flashes being variable according to speed of retrieve and other factors such as presence or absence of current and so on.

FIG. 5 depicts in four views the powder paint process for fishing lures in accordance with the invention for achieving a three color finish. Again the substrate here is plated steel, or more particularly, a nickel-plated steel spinner blade. In FIG. 5, the three referenced colors comprise the substrate's original color (eg., silvery), one paint color (eg., white) and then another paint color (eg., red).

The process in accordance with the invention comprises many of the same activities as in the two color example shown in connection with FIG. 4, except that the activities of heating and applying color as shown by views step 2 and 3 of FIG. 5 are repeated, originally for the white color and then successively for the red color.

The heating and powder-application phases are undertaken in cycles. In FIG. 5, preferably the first cycle is devoted to the first color, the second cycle to the second cycle. The worker re-heats the blade during the second cycle by waving the blade in hot stream of the heat source about 5–10 seconds in the stream, then 5 seconds out to allow dissipation of the hot spots to spread out more evenly throughout the blade. This is repeated about two more times for a total of three times of waving the blade in the stream and then sitting it outside the stream. It is advised to not try and heat the metal up too quick. The worker should want to give time for heat to spread evenly across blade, otherwise get blisters will form where heat scorches the blade while the edges remain too cool.

Sprinkling technique of third color requires practice to obtain the sufficient level of skill. In FIG. 5, the worker strives to very finely dust whole blade in the second (red) color but not too much. The worker should want to avoid covering up both the underlying splotches of white color as well as all the remnant bare silvery color. The object of the third color is simply to provide an enhancement over the other two colors.

The view of step 4 shows the end product after application of the holographic film tape and attachment of the optional eye button. As in FIG. 4, it is sufficient to leave the back side bare and untreated.

FIG. 6 depicts in seven views the powder paint process for fishing lures in accordance with the invention for achieving a multi-aspect four color finish. Again the substrate is a nickel-plated steel spinner blade. The four colors comprise that of the exposed substrate, one color (eg., white), another color (eg., black), and then another color (eg., red).

The repetition of activities to obtain a four color are comparable to the three color version of the invention shown by FIG. 5 except that the re-heating and sprinkling go like this.

The view of FIG. 6's step 1 shows a bare, as yet untreated blade. The view of FIG. 6's step 2 shows the completion of heating and coating with a spread of white powder paint much as previously described.

The view of FIG. 6's step 3 shows the completion of heating and coating with a spread of a second color (eg., black) of powder paint much as previously described in connection with the color red in FIG. 5. The view of FIG. 6's step 4 shows the completion of heating and coating with a spread of white powder paint only on the lower half of the blade. This achieves an aspect of lightening up the color tone of the belly of the blade in imitation to baitfish. That is, baitfish typically have white bellies and dark tops, and shade from dark to light from top to bottom in a gradual progression except that usually there is a marked transition at the lateral line. The view of FIG. 6's step 4 shows that as being the object of putting more white on top of the earlier layers of white and black. The view of FIG. 6's step 5 shows the sprinkling of a trail of red to form a streak as shown. The red colored streak or stripe is a trigger mechanism to prey fish as it is believed to signify a distressed or bleeding bait fish. The view of FIG. 6's step 6 shows the completion of the application of the holographic film tape. The view of FIG. 6's step 7 shows the completion of the attachment of the optional eye button.

Given the foregoing, pause can be taken to state various objects of the invention as the objects ought to be better understood with the foregoing background. One object of the invention is to provide a powder paint process to fishing lures in order to provide the painted lures with a more natural resemblance of the holographic (or iridescent) hue of live bait fish. An alternate object of the invention to provide a powder paint process to fishing lures in order to provide the painted lures with a more natural resemblance of the pattern of live bait fish. That is, one object is concerned with natural holographic (or iridescent) hue as the other is concerned with natural pattern. The two and three color processes shown by FIG. 4 or 5 achieve the one object in respect of natural holographic hue of live bait fish. The four color process shown by FIG. 6 better achieves the other object in respect of natural pattern of live bait fish in combination with natural holographic (or iridescent) hue.

FIG. 7 depicts in three views the powder paint process for fishing lures in accordance with the invention for achieving a three color finish wherein the substrate is aluminum, or more particularly, an aluminum buzzbait blade. The three colors are the substrate's color (eg., silvery), one paint's color (eg., sparsely applied white) and then another paint's other color (eg., chartreuse).

Since the substrate is aluminum, the worker can be a little more relaxed about worries with overheating the blade because there is no plating in danger of blistering. Also, this blade is painted on both sides. Preferably the worker paints one side front and back with one color (ie., the white in FIG. 7's step 1). Then the worker repeats the process front and back for the second color (eg., the chartreuse in FIG. 7's step 2), and so on for a third color or more (if any). The worker heats or re-heats the blade each time with about 5–10 seconds of bathing the blade in the hot stream of the torch's flame exhaust. FIG. 7's step 3 shows the completion of the application of the holographic film tape. It is applied to both sides, and this can take a practiced worker about seven minutes or so.

FIG. 7 shows a completed blade in which the white under-coating is really sparse or, that is, very sparingly applied. The worker intentionally does this because the worker has in mind the skirt he wants the blade to match. Therefore the worker wants more of a silvery appearance, so he just dusted the aluminum substrate with ever so sparingly a coating of white. Again, the object is to think ahead to matching skirt color, whether the choice is to complement or contrast with the skirt color. For example, one preferred skirt to combine with this blade might be chartreuse with holographic silver. So here the worker wants more silver than white. However, the chartreuse paint layer is more dense.

FIG. 8 depicts in six views the powder paint process for fishing lures in accordance with the invention for achieving a multi-aspect four color finish. The substrate is lead, or more particularly, a leaden jig head. The four colors comprise black, white, red, and silvery. FIG. 8's step 1 shows that the leaden jig head has been heated and then dipped in black paint to achieve a solid black base. FIG. 8's step 2 shows that the jig head has been re-heated and then partially dipped in white paint to achieve a solid white over only the lower half of the jig head, in order that is to begin the resemblance of a light colored belly. FIG. 8's step 3 shows completion of re-heating and then application of a sprinkle of white in moderate dot-density over dark or black top. FIG. 8's step 4 shows the completion of re-heating and then application of a sprinkle in an amount of low dot-density of the color black over the light or white belly. This achieves the blending or transition of dark and light from top to bottom while retaining a prominent transition at the lateral line. It gives an observer an optical illusion because if an observer stares at it for long enough, the eyes play tricks. Sometimes the observer focuses on the underlying base of one color covered over by sprinkles of the contrasting color, and then suddenly the observer is mixing up in his mind the substrate of the contrasting color cover over by a sprinkle of the one color again.

FIG. 8's step 4 also shows that the worker re-heated the jig ahead a repetitive succeeding time in order to apply a small sprinkle or dash of a little red on an area of belly corresponding to gills. FIG. 8's steps 5 and 6 show the completion of attachment of the holographic film tape and the attachment of the eye buttons. The opposite side of the jig head is more or less an imperfect mirror image of the side shown by the view. The eye button includes a dark center surrounded by a silver ring. Since the relative area of the silver ring is proportionally more significant than it was relative to the much larger blades of the previous views, its silver counts in as providing a fourth color to the pattern.

FIG. 8's step 6 also shows the completion of an optional over-coating of the jig head with an epoxy over-coat. To get this the worker dipped the jig head in clear epoxy. The clear epoxy gives the jig head a relatively chip-proof shell. This epoxy overcoat is desirable especially for jig heads because jig heads suffer relatively more punishment in use than blades. To begin with, jig heads are fished often times bouncing against rocky or stony bottoms. Also, jig heads are stored during non-use for long periods of time with artificial plastic tails attached to them. The oils and preparations that exude from the different manufacturers' artificial tails are often times reactive. The epoxy overcoat provides protection against much of what punishes jig heads.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A lure for retrieval by fishing line, comprising:
   an underlying wire having a central, line-pulled leading portion flanked by first and second trailing arms terminating in respective outer ends;
   a reaction impeller assembly mounted for rotation about the wire on the first arm;
   a leading deflector and trailing fish hook mounted on or to the second arm;
   wherein said reaction impeller assembly comprises dual double-bladed units, each comprising a central body portion extending axially between leading and trailing apertured lugs and radially between angularly-spaced first and second blade portions having leading delta-portions changing into trailing flap portions, said double-bladed units being fixed together by fixing at least the respective leading apertured-lug portions to each other, or at least the respective trailing apertured lug-portions to each other, and providing for all the apertures thereof to be able to align on a common axis for threading the first arm therethrough;
   said blade portions presenting four angularly-spaced blade tips at the outboard extremes thereof which, in combination with the arrangement of the arms and under pull of retrieval by the fishing line, strike against the deflector on the second arm for fish-attracting effects.

2. The lure of claim 1 wherein each double-bladed unit is produced from sheet metal including sheet aluminum and is arranged such that the central body portion is generally planar and the delta-portions, also generally planar, diverge from the central body portion at respective creases to be generally perpendicular, to each other, said lugs comprising formed-over tabs of the axially-spaced ends of the central body portion, whereby the arrangement of four blades allows for slower retrieves that ride the lure on surface without sinking than obtainable with two blades.

3. The lure of claim 1 wherein said deflector comprises an apertured cylindrical-form, bead or beads threaded on the second arm.

4. The lure of claim 1 wherein the blades are produced from sheet metal including sheet aluminum such that one fish-attracting effect of the blades striking the deflector is production of sound approximately like that of a cow-bell.

5. The lure of claim 1 wherein the fixed together lugs are fixed by welding, brazing, braze welding, epoxy bonding or other bonding techniques.

6. A lure for retrieval by fishing line, comprising:

an underlying wire having a central, line-pulled leading portion flanked by first and second trailing arms terminating in respective outer ends;

a reaction impeller mounted for rotation about the wire on the first arm;

a leading slug and a trailing fish hook mounted on or to the second arm;

wherein said reaction impeller comprises more than two angularly-spaced metal blades projecting radially from fixed origins in an axially-elongated central body whereby such arrangement of more than two blades allows for slower retrieval that rides the lure on the surface without sinking than obtainable with two blades;

each blade having leading delta-portions changing into trailing flap portions, said reaction impeller presenting more than two angularly-spaced blade tips at the outboard extremes thereof which, in combination with the arrangement of the arms and under pull of retrieval by the fishing line, strike against the slug on the second arm for fish-attracting effects.

7. The lure of claim 6 wherein said reaction impeller is a single piece end-product of sheet metal and is produced from a flat pattern in which a leading apertured-lug is a center of geometry therefor, the end-product central body having generally planar components which in the flat pattern radiate from the leading apertured-lug on spoke lines and terminate in tabs for forming over to produce trailing apertured-lugs, the blades in the flat pattern arranged relative the leading apertured-lug as petals and wherein the end-product delta-portions are also generally planar and diverging from respective ones of the central body's planar components at respective creases to be relatively equi-angularly spaced from one another, whereby all apertures of said apertured lugs in the end-product reaction impeller are able to align on a common axis for threading the first arm therethrough, whereby one fish-attracting effect of the metallic blades striking the slug is a production of sound approximately like that of a cow-bell.

8. The lure of claim 7 wherein said slug is metallic and comprises an apertured cylindrical-form, bead or beads threaded on the second arm for enhancing the metallic sound effect.

9. The lure of claim 7 further comprising a rusted-steel pop rivet body secured to the first arm for directly contacting the reaction impeller in a fashion allowing rotation thereof and further enhancing the metallic sound effect.

10. The lure of claim 7 wherein the reaction impeller further comprises an additional blade so that there are more than three blades.

11. The lure of claim 7 further comprising dressing and weighting for the tiling fish hook.

12. A reaction impeller for a buzzbait, comprising:

more than two angularly-spaced metal blade portions projecting radially from a common central body and having leading delta-portions changing into trailing flap portions, which common central body is apertured for rotational mounting on a shaft of the buzzbait, wherein all the blade portions are fixed tight to the common central body in order to maintain permanent constant angular-spacing among all said blade portions during use and so enhance the straightness and smoothness of a retrieve of the buzzbait utilizing said reaction impeller, whereby such arrangement of more than two blade portions allows for a slower retrieval that rides the buzzbait on the surface without sinking than obtainable with two blade portions and whereby such a fixed-tight arrangement among all the blade portions allows the retrieves of the buzzbait utilizing said reaction impeller to come back straighter and smoother than a floppy, unnaturally erratic return of a buzzbait in which not all the blade portions are fixed tight to maintain permanent constant angular-spacing thereamong during use, and wherein said reaction impeller comprises a pair of fixed together, pre-constructed double-bladed units, each unit comprising a central body portion extending axially between leading and trailing apertured lugs and radially between angularly-spaced first and second blade portions, said double-bladed units being fixed together by fixing at least the respective leading apertured-lug portions to each other, or at least the respective trailing apertured lug-portions to each other, and providing for all the apertures thereof to be able to align on a common axis for threading the shaft therethrough.

13. The reaction impeller of claim 12 wherein each double-bladed unit is produced from sheet metal including sheet aluminum and is arranged such that the central body portion is generally planar and the delta-portions, also generally planar, diverge from the central body portion at respective creases to be generally perpendicular to each other, said lugs comprising formed-over tabs of the axially-spaced ends of the central body portion, whereby the reactor impeller's central body comprises the central body portions of the pair of double-bladed units spaced approximately diametrically opposite each other.

14. The reaction impeller of claim 12 wherein the fixed together lugs are fixed by welding, brazing, braze welding, epoxy bonding or other bonding techniques.

15. The reaction impeller of claim 12 wherein said reaction impeller is a single piece end-product of sheet metal and is produced from a flat pattern in which a leading apertured-hub portion is a center of geometry therefor, the end-product central body having at least one generally planar component which in the flat pattern radiates from the leading apertured-hub portion on a spoke line and terminates in a tab for forming over to produce a trailing apertured-hub, the blades in the flat pattern arranged relative the leading apertured-hub as petals and wherein the end-product delta-portions are also generally planar and diverging from respective ones of the central body's planar components at respective creases to be relatively equi-angularly spaced from one another, whereby all apertures of said apertured-hub portions in the end-product reaction impeller are able to align on a common axis for threading the shaft of the buzzbait.

16. The reaction impeller of claim 15 wherein the reaction impeller further comprises an additional blade so that there are more than three blades.

17. The reaction impeller of claim 12 wherein the metal blades and central body are produced from sheet metal.

* * * * *